United States Patent [19]

Grossman et al.

[11] 4,062,146
[45] Dec. 13, 1977

[54] SHADE PRODUCING SYSTEM

[75] Inventors: Harold Grossman, Chicago; Sherman Mandel, Wilmette, both of Ill.

[73] Assignee: Simtrac Inc., Chicago, Ill.

[21] Appl. No.: 422,185

[22] Filed: Dec. 6, 1973

[51] Int. Cl.² .................................................. A01G 9/00
[52] U.S. Cl. .................................. 47/17; 47/DIG. 6; 49/358; 135/5.2; 160/2; 160/331
[58] Field of Search .................... 47/17, 26–29; 160/331, 84 R, 194–199, 38–39, 129; 16/87.2, 87.4 R, 91, 93 R, 94 R, 94 D, 95 R, 96 R, 96 D; 135/1, 3 R, 3 E, 4 R, 5 R, 5 B, 5 E, 5.1, 5.2, 7.12, 8, DIG. 1, DIG. 8

[56] References Cited

U.S. PATENT DOCUMENTS

| 461,452 | 10/1891 | Scrugham | 191/44.1 |
|---|---|---|---|
| 642,370 | 1/1900 | Rollins | 47/28 |
| 751,713 | 2/1904 | Berry et al. | 47/28 |
| 858,965 | 7/1907 | Dever | 14/14 |
| 1,610,934 | 12/1926 | Delany | 403/43 |
| 2,193,921 | 3/1940 | Gibbons | 47/17 |
| 2,384,212 | 9/1945 | Taylor | 135/8 X |
| 2,990,458 | 6/1961 | Mageoch | 191/44.1 |
| 3,091,286 | 5/1963 | Madsen | 160/331 |
| 3,103,764 | 9/1963 | Hever | 47/29 |
| 3,153,256 | 10/1964 | Stark et al. | 160/38 X |
| 3,331,428 | 7/1967 | Ford | 160/331 |
| 3,374,823 | 3/1968 | Ford | 160/331 |
| 3,418,752 | 12/1968 | Stratton | 47/28 |
| 3,481,073 | 12/1969 | Yoshida et al. | 47/17 |
| 3,715,776 | 2/1973 | Tawaka | 16/94 D |

FOREIGN PATENT DOCUMENTS

| 371,926 | 6/1902 | France | 47/28 |
|---|---|---|---|
| 830,390 | 2/1952 | Germany | 16/94 D |
| 1,434,822 | 11/1968 | Germany | 160/84 R |
| 717,643 | 10/1966 | Italy | 160/84 R |
| 695,829 | 9/1965 | Italy | 47/26 |
| 53,327 | 5/1967 | Poland. | |

OTHER PUBLICATIONS

S.A. Searle and B.J. Machin Chrysanthemums The Year Round, pp. 166-169 and FIG. 41 and 42 on the plate between pp. 208 and 209.

Primary Examiner—Clifford D. Crowder
Assistant Examiner—James R. Feyrer
Attorney, Agent, or Firm—Rummler & Snow

[57] ABSTRACT

A shade producing system including a powered track having a novel power driven motor for drawing a shade cloth between a gathered and extended position. The system may include suspension tracks for holding th cloth spread. Splicing means for the powered and suspension tracks are provided for achieving the desired length of extension of the cloth. A novel suspension strip structure is provided on the shade panel for suspending the shade cloth from the tracks.

4 Claims, 10 Drawing Figures

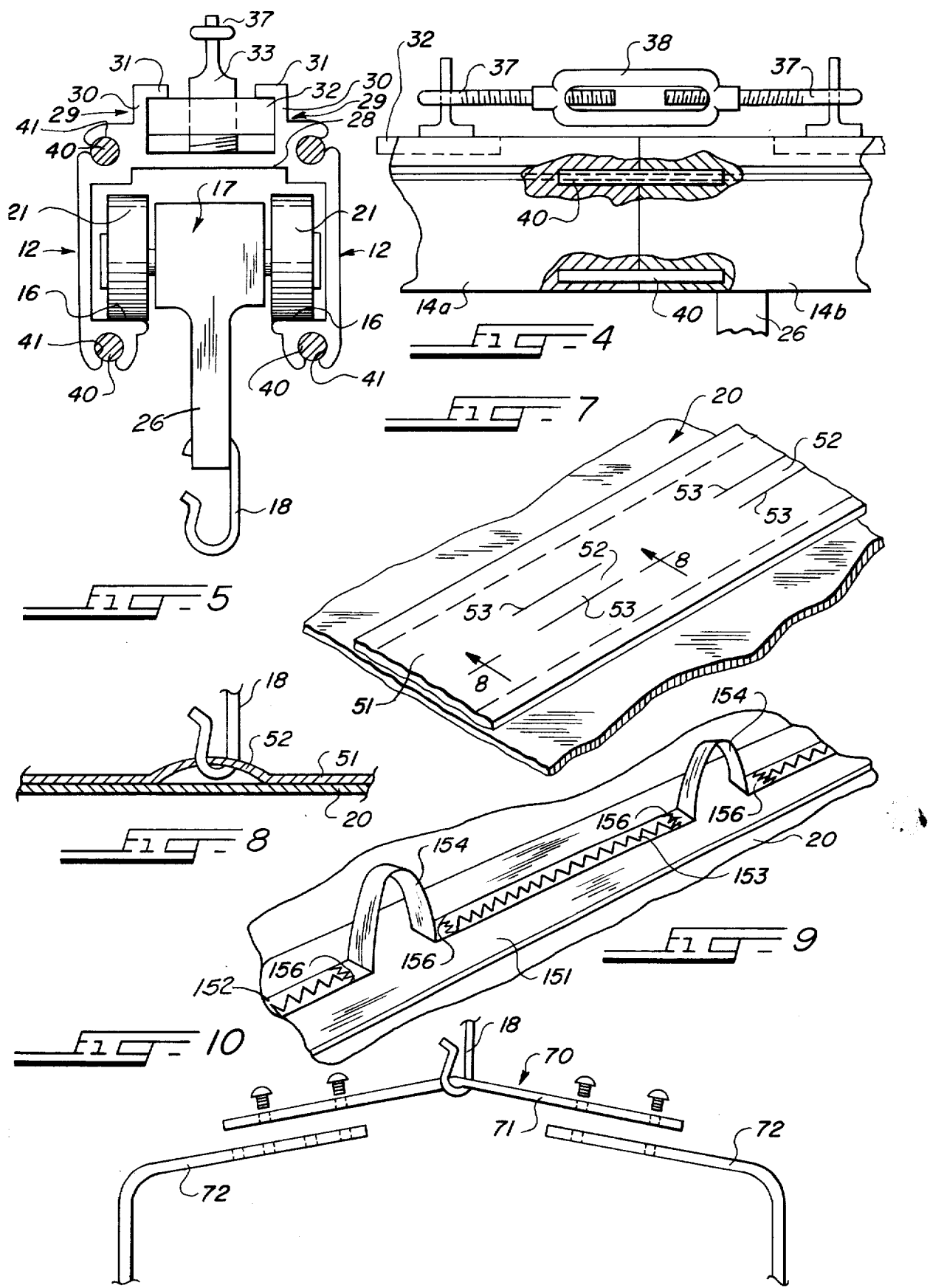

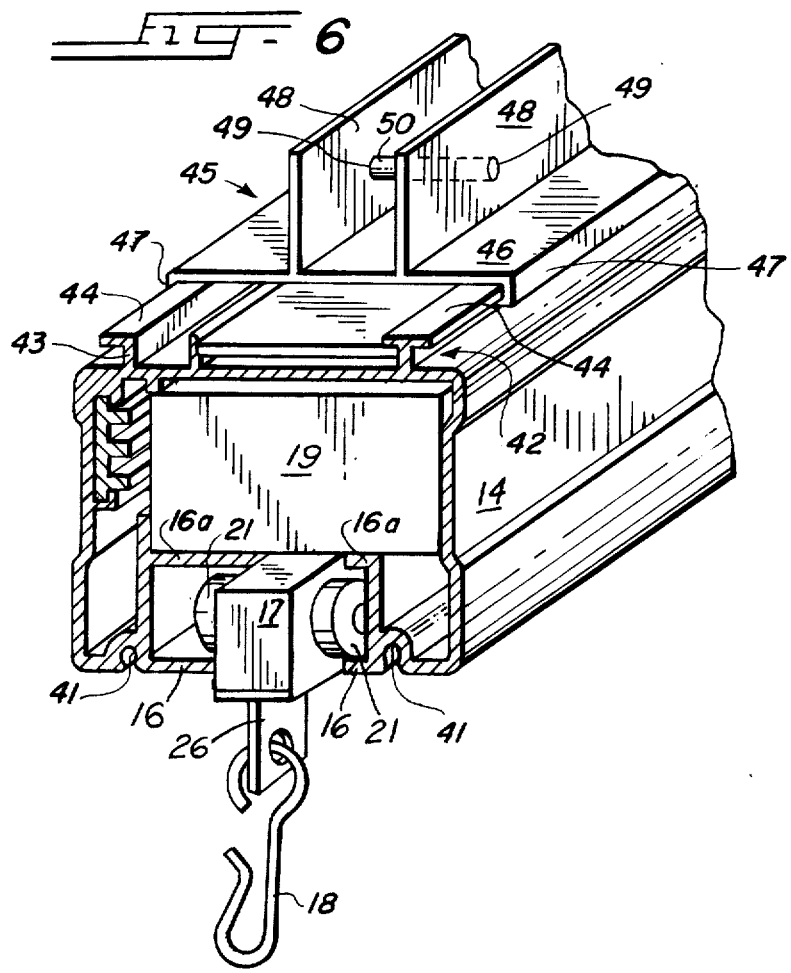

SHADE PRODUCING SYSTEM

BACKGROUND AND SUMMARY OF THE INVENTION

The present invention relates to shade providing systems for greenhouses and the like and more particularly to an automated shade system which is actuated between an operative shade producing position and a stored position by powered means.

The shade providing systems of the present invention are intended for use primarily in horticultural establishments such as greenhouses and the like where it is required to control the exposure of the plants to the sunlight. To this end, the area over the benches may be enclosed by panels such as drapes or the like. These drape panels heretofore have been supported on cables and had to be manually drawn into position. This procedure is not only time consuming but also requires the use of a number of employees because of the area which has to be covered.

By the present invention, it is proposed to provide a new and improved shade providing system which minimizes many of the problems encountered heretofore. This is accomplished generally by the provision of a shade providing system including at least one powered track on which a drape or shade cloth is supported for covering an area. The powered track includes a self-contained motor means having a novel track guiding means for drawing the shade cloth between a gathered stored position and to an extended position for shading a selective area.

The shade system may also include suspension tracks spaced from the powered track means for maintaining the shade cloth or panel elevated above the benches. The suspension tracks are devoid of any actuating means and serve merely as a support and guide for the shade cloth.

In another embodiment of the invention, shallow inverted U-shaped frame members are carried by a single powered track and serve as the sole support for the shade cloth above the benches.

The present invention also provides a novel means for splicing sections of powered and suspension tracks so that the desired area may be covered. To this end, each of the powered track sections and the suspension track sections are formed with channel guides. Brackets with complementary guide means are selectively positioned adjacent to the ends of each section and fixed against sliding movement. A turnbuckle is connected between the brackets and tightened to maintain the sections in abutting relationship.

Another feature of the invention is the provision of a novel strip for fastening and suspending the shade cloth to the powered track means and the suspension tracks. To this end, a fastening strip made from a synthetic fabric is provided with a pair of lengthwise spaced slits formed by heat slitting. The slits define loops through which the hooks depending from the tracks are inserted to hold the shade cloth suspended.

BRIEF DESCRIPTION OF THE DRAWINGS

FIG. 4 is a fragmentary side elevational view at the splice of two suspension track sections.

FIG. 5 is an end elevational view of a suspension track section.

FIG. 6 is a fragmentary perspective view of the power unit mounted in the powered track.

FIG. 7 is a fragmentary perspective view of a shade cloth with the hanger attachment strip fastened thereon.

FIG. 8 is a fragmentary elevational view showing the manner in which the shade cloth is suspended from the hooks on the tracks.

FIG. 9 is a fragmentary perspective view of another embodiment for suspending the shade cloth from the powered and suspension tracks.

FIG. 10 is an elevational view of a frame member used to support the shade cloth in the embodiment illustrated in FIG. 3.

DESCRIPTION OF THE PREFERRED EMBODIMENT

Figure 1:
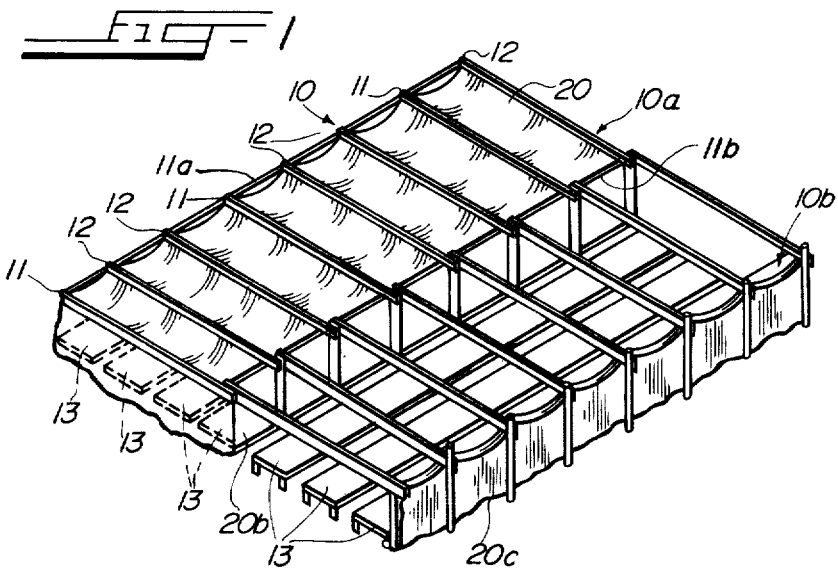
FIG. 1 is a perspective view of a shade providing system embodying the structure of the present invention.

Referring now to the drawings, and in particular FIG. 1, there is shown a shade providing system 10 adapted for use in covering a plurality of rows of benches or beds 13 of the type used in horticultural establishments. The shade system 10 is used to control the exposure of light, in particular sunlight, to control the growth of plants in the benches 13.

As shown in FIG. 1, the system 10 includes a plurality of spaced powered tracks 11 arranged parallel to each other and to a plurality of suspension tracks 12 which are supported in a horizontal position above the benches 13 by suitable framing. In the embodiment shown, two of the suspension tracks 12 are disposed between adjacent ones of the spaced powered tracks 11.

Each powered track 11 comprises generally a hollow or tubular track in which a magnetic power capsule 19 is located. The capsule may be connected to a switch, not shown, for actuation. For a more detailed description of the linear motor and power track structure, reference is made to U.S. Pat. Nos. 3,374,823 and 3,531,666.

Briefly, as shown in FIG. 6, the powered track 11 comprises an extruded column of generally inverted U-shaped cross section including a pair of transversely spaced horizontal track flanges 16a—16a forming a track. The track flanges 16a—16a support the capsule 19 to which the fore end of the curtain 20 is affixed (not shown in the drawing). The rest of the shade curtain 20 is secured to a series of hangers 17 (only one shown in the drawing) to which are attached supporting hanging hooks 18, the details of which appear hereinafter.

The capsule 19 is an elongate stator member including a core of magnetic material having a plurality of winding slots in which windings are positioned. The member 19 is mounted for movement lengthwise of the column 14 on tracks 16a—16a. Energizing means (not shown) is provided for actuating the stator for lengthwise movement. For a more detailed description of the actuating means, reference is made to the aforementioned U.S. Pat. Nos. 3,374,823 and 3,531,666.

Rollers 21—21 are mounted along the sides of the hanger 17 and the rollers 21 are mounted for rotation about a horizontal axis so as to be rollable on flanges or ledges 16—16 which are directly below the track flanges 16a—16a.

The suspension tracks 12 are also extruded and have the general configuration of the power track 11 with a slightly different upper configuration due to the fact no motor is required therewith, hence they are smaller in size. Compare FIGS. 5 and 6. The same numerals are used for the parts and appurtenances which are identical in function.

Hooks 18 are attached to the lower ends 26 of the hangers 17 and suspend the curtain 20 therefrom.

The length of the area to be covered may be such that it is not feasible to make a column of a single required length. To achieve the required length, a plurality of lengths of the suspension column lengths, as shown in FIG. 4, are spliced together. As shown in FIG. 4, the track column lengths 14a and 14b are held in abutting relationship so as to provide a continuous uninterrupted trackway.

The column lengths 14a and 14b are of identical cross section and include a top wall 28 having a pair of spaced inverted L-shaped flanges 29—29 including horizontal legs 31 spaced above the walls 28. Slidably supported between the walls 28, the legs 31 and the vertical legs 30 of each of the column sections 14a and 14b are blocks 32 through which vertically disposed bolts 33 are threaded. Upon inward threading of the bolts, the blocks 32 frictionally engage the legs 31 and prevent further lengthwise movement. The blocks 32 and bolts 33 are selectively positioned adjacent the abutting ends of the column sections 14a and 14b. Each of the bolts 33 terminates in a flat head and the resulting upstanding projection receives the eye end of a threaded eye bolt 37 of which the other ends are threaded in a turnbuckle 38. After the blocks 32—32 are selectively positioned, the turnbuckle 38 is then tightened to maintain the adjacent ends of the columns 14a and 14b in abutting relationship. As shown in FIG. 4, the latching means on each column 14a-14b that is bolts 33 and 37, end turnbuckle 38, is spaced away from the abutment. To hold the column section in alignment, pins 40 are received in grooves 41 formed along each of the four corners of the channels of the suspension channels. The channel sections 14 of the power tracks 11 are similarly spliced. However, a slightly different arrangement is employed in the power track extrusion. As shown in FIG. 6, a pair of spaced inverted L-shaped members each comprise a vertical leg 43 and laterally outwardly-extending horizontal members 44. A saddle 45 has a horizontal leg 46 terminating at the free ends in a reverse bend portion 47 to substantially loosely envelop the horizontal legs 44 for slidably fitting thereover. A pair of spaced vertical legs 48 extend upwardly from the member 46 and each is provided with an aligned aperture 49 for the reception of a pin 50 which is press fitted therein. Adjacent lengths of power tracks are end abutted against each other and similar saddles 45 placed thereon adjacent the ends thereof. A turnbuckle 38 and bolts 33, 37 identical with that shown in FIG. 4 are employed to anchor the abutting channels. As the turnbuckle is tightened, the forward ends of the saddle 45 will cant and bind the saddle in the desired position. Each power track is also provided with grooves 41 for the reception of pins 40 to insure proper alignment of adjacent channels.

The covers 20 or shade cloths (FIGS. 1 to 3) are preferably made from a suitable heavy light-excluding material. A suspension ribbon 51 made from a suitable heat-responsive synthetic material is stitched or heat-sealed to the cover 20 along the lines at which the cover is to be suspended on the powered track 11 and suspension tracks 12. Suspension loops 52 are formed in lengthwise spaced relationship along the ribbons by transversely spaced slits 53—53. The slits 53 are formed by inserting a heated slitter. The heated slitter serves to prevent fraying along the edges of the loop 52 and thereby increases the resistance to wear. As shown in FIG. 8, the hooked ends of the hangers 18 are insertable through the loops 52 thereby to suspend the curtains 20 from the powered and suspension tracks 11 and 12.

Referring now to FIG. 9, there is shown another embodiment of tape assembly which is attachable to the panel 20 for suspending the latter from the hooks 18. As shown, the tape assembly includes a tape or webbing 151 on which ribbon 152 is sewn by means of a zig-zag stitch 153. The ribbon 152 is provided with lengthwise spaced loops 154 which are formed by tack stitching 156 on opposite sides thereof. The loops 156 are suspended from the hooks 18 in the same manner as described in the embodiment of FIGS. 5 and 8.

As shown, the shade system 10 of FIG. 1 includes two sections 10a and 10b of which the covers open and close in opposite directions. The system may also have vertical side and end drapes 20b and 20c which may be suspended from powered tracks 11a and 11b supported along the sides and ends of the system.

Figure 2:
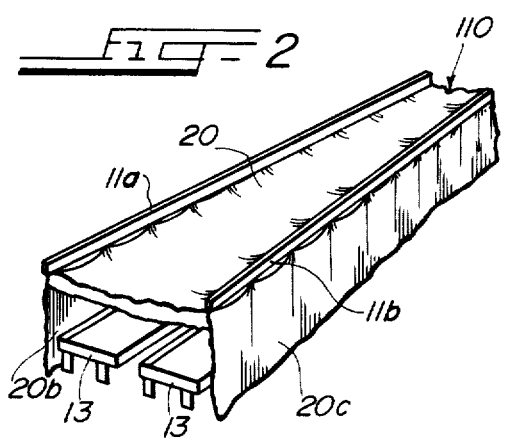
FIG. 2 is a perspective view of another embodiment of a shade providing system.

Referring now to FIG. 2, there is shown a shade system using only two parallel and transversely spaced powered tracks 11a and 11b. The powered tracks 11 may support both a curtain 20 and side drapes 20b and 20c. This figure illustrates ready application of a shader operating over a pair of benches or beds 13.

Figure 3:
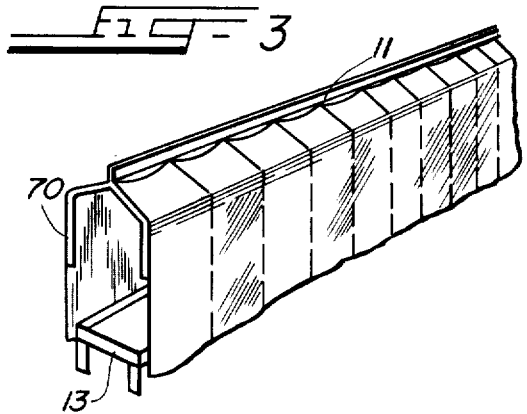
FIG. 3 is a perspective view of still another embodiment of a shade providing system.

FIGS. 3 and 10 show a system employing only a single powered track 11. The powered track 11 is supported on suitable framing and carries a plurality of fabricated stay members 70 of generally umbrella contour. The stay members 70, as shown in FIG. 9, each include an inverted shallow V-shaped bar 71 of which the vertex is suspended from the hanger hooks 18 carried by the powered track. Spreader arms 72 are adjustably fixed to the ends of the bar 71 to maintain the cover 20 spread over the longitudinal line of benches or beds 13.

It should now be obvious that if the tracks 12 and appendates were used in the unit shown in FIG. 2 in place of the powered tracks, the curtain could be manipulated by a rope and pulley arrangement or by manually shifting the curtain.

It is to be understood that numerous details of this invention may be altered or omitted without departing from the spririt of this invention as defined by the following claims.

We claim:

1. A shade system for shading an area in a greenhouse comprising:
   a. a frame
   b. powered track means comprisng a hollow column and magnetic capsule disposed therein supported by said frame;
   c. suspension track means laterally spaced from, parallel to and coextensive with said power track means and supported by said frame;
   d. a shade producing panel depending from said power track means and said suspension track means, said power track means and said suspension track means each comprising a plurality of sections respectively oriented in end-to-end relationship having further means to maintain said sections in end-to-end abutting engagement thereby extending the effective length of said power track means and said suspension track means respectively, said further means comprising block means adjacent the ends of each of said sections fastened against lengthwise movement and turnbuckle means connected between said block means to hold said sections in abutting engagement.

2. The invention as defined in claim 1, wherein said hollow column defines a bore having a pair of transversely spaced track means extending into said bore, said magnetic capsule having a roller means rotatable about a pair of horizontal axes ridable on said transversely spaced tracks.

3. The invention as defined in claim 1 wherein said powered track means and said suspension track means each has a base, each of said track means comprising a pair of transversely spaced inverted L-shaped legs spaced from said base, said block means slidably disposed between said base and said legs and bolt means projecting through the respective ones of said block means to secure said blocks against sliding movement on said base.

4. The invention as defined in claim 3 wherein said bolt means on each of said sections includes upstanding projections and said turnbuckle means comprises a turnbuckle and eye bolts for attachment to said bolt means at said upstanding projections.

* * * * *